May 15, 1928.

V. A. FYNN 1,670,030

NONSYNCHRONOUS MOTOR

Original Filed July 5, 1924

Inventor:
VALÈRE ALFRED FYNN,
By John H Bruninga
His Attorney.

Patented May 15, 1928.

1,670,030

UNITED STATES PATENT OFFICE.

VALÈRE A. FYNN, OF ST. LOUIS, MISSOURI.

NONSYNCHRONOUS MOTOR.

Original application filed July 5, 1924, Serial No. 724,395. Divided and this application filed August 2, 1926. Serial No. 126,687.

This application is a division of application Serial Number 724,395, filed by me July 5, 1924.

My invention relates to asynchronous induction motors and particularly to the improvement or control of the power factor or to the compensation of such motors.

In the parent application I have shown among other things how the power factor of a motor of this type can be controlled, and made unity or nearly so when desired, while opposing the formation of working currents in the exciting or power factor controlling circuits of the motor. This application is directed to subject matter more particularly disclosed in Fig. 5 of the parent application.

The objects and features of this invention will clearly appear from the detailed description taken in connection with the accompanying drawing and will be pointed out in the claims.

Figure 1:
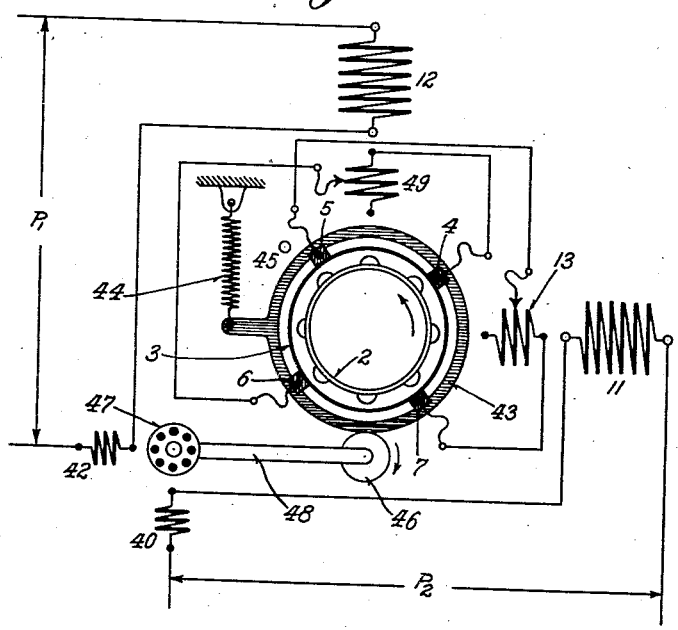
Figure 2:
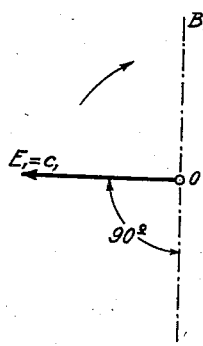
Figure 3:
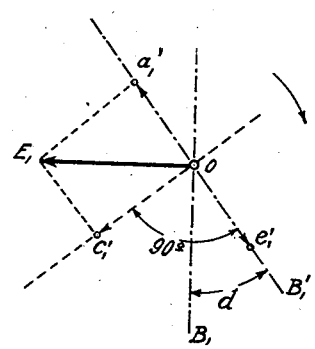

Fig. 1 of the accompanying drawing diagrammatically represents a two-pole embodiment of my invention, Figs. 2 and 3 are explanatory diagrams. These figures are reproductions of Figs. 5, 8 and 9 of the parent application.

Referring to the Fig. 1 which represents a two-phase motor, the rotor, which is the secondary, carries a squirrel cage winding 2 adapted to take care of the load currents and a commuted winding 3 adapted to take care of the secondary exciting currents and from which more or less of the load currents can be excluded. A polyphase arrangement of brushes 4, 6 and 5, 7 cooperates with the commuted winding, all of the brushes being insulatingly carried by means of a brush rocker 43 which is movable and normally under the control of the spring 44 which holds the movable brush rocker arm against the stop 45. The stator or primary carries two windings 11, 12 displaced by 90 electrical degrees and connected to the supply. The stator also carries auxiliary adjustable windings 13 and 49, the first being coaxial with 11 and the second with 12. The auxiliary two-phase motor 40, 42, 47 is adapted to move the brush rocker arm 43 through the shaft 48 and the gear wheel 46 engaging with 43. This auxiliary motor comprises an ordinary squirrel cage rotor 47 and a stator provided with the two inducing windings 40, 42. The winding 40 is connected to the supply in series with the main motor winding 11 and the winding 42 is connected to the supply in series with the main motor winding 12. The auxiliary voltage $E_1$ derived from the auxiliary winding 13 is impressed on the commuted winding 3 through the brushes 5, 7. The auxiliary voltage $E_2$ derived from 49 is impressed on the commuted winding by means of the brushes 4, 6. The magnitude of the auxiliary voltages can be changed but not their phase. The phase of the working voltages with which these auxiliary voltages cooperate can, however, be modified by displacing the movable brush rocker arm 43. In this arrangement this arm is displaced in response to variations in the primary current of the motor which variations correspond to changes in the slip of the machine. At no load the brushes 5, 7 are displaced by about 90 electrical degrees from the auxiliary winding 13 to which they are connected and this displacement increases with increasing load. The same holds true of the brushes 4, 6 and the winding 49 to which they are connected.

It will be understood that while a two-phase arrangement of brushes on the secondary has been shown in connection with a two-phase primary, this coincidence of phases as to primary and secondary is by no means necessary. The primary may carry $n$ windings and the secondary may have an $m$-phase arrangement of brushes, in which the number $m$ differs from the number $n$ and both are greater than one.

In Fig. 1 the polyphase arrangement of brushes is movable. At no-load the brush rocker arm 43 is under the control of the spring 44 and rests against the stop 45. The inducing windings 40, 42 of the auxiliary motor 40, 42, 47 are each connected in series with one of the windings 11, 12 of the main motor and so dimensioned that with the no-load current of the main motor circulating through these windings the rotor 47 of the auxiliary motor does not exert enough torque to move the brush rocker arm 43 away from the stop 45. But as the load on the main motor increases 47 overpowers 44 and 43 is moved in a counterclockwise direction and with the rotation of the secondary and of the basic magnetization of the machine.

When 43 is in its no-load position the brushes 5, 7 are practically in line with the axis of 12 and the brushes 4, 6 practically in line with the axis of 11. The auxiliary voltages $E_1$ and $E_2$ derived respectively from the auxiliary stator windings 13 and 49 are at this time of the proper phase to excite the motor from the secondary, as shown in Fig. 2, where $B_1$ indicates the axis of the brushes 5, 7 and the phase of the working voltage $e_1$ which at no-load is very small, positive and not shown in Fig. 2. At no-load all of $E_1$ does duty as $c_1$ in the circuit of the brushes 5, 7 and all of $E_2$ does duty as $c_2$ in the circuit of the brushes 4, 6. The voltages $C_1$ and $C_2$ are the secondary exciting voltages. As the load increases $e_1$ increases and the brushes are displaced with rotation. This movement of the brushes does not change the magnitude of $e_1$ or of $e_2$ but changes the phases thereof with respect to the phases of $E_1$ and $E_2$ in proportion to the angle $d$ by which the brushes have been displaced from their original no-load position. The magnitude of $e_1$ and $e_2$ simply changes with the slip regardless of the space location of the brushes. When the brushes are moved by 47 from the axis $B_1$ of Fig. 3 to the axis $B'_1$ in response to an increase in load then $e_1$ increases from the very small value it had in Fig. 2 to the value $e'_1$ shown in Fig. 3 and it is seen that $E_1$ now leads $e'_1$ by more than 90 degrees. Under these conditions, the auxiliary voltage $E_1$ introduced into the brush circuit 5, 7 is decomposed into a component $c'_1$ which leads $e'_1$ by 90 degrees and a component $a'_1$ which leads it by 180 degrees. The auxiliary motor and the spring 44 can be so dimensioned that the working-current-opposing-component $a_1$ of $E_1$ is at each load practically equal to the corresponding working voltage $e_1$, in which case the exciting winding 3 will be kept practically free from load currents. It is seen that under the conditions named and shown in Fig. 1 the component $c_1$, responsible for the excitation of the secondary, diminishes with increasing brush displacement, that is with increasing load, because $E_1$ remains constant as to magnitude unless adjusted by hand. A very satisfactory way of operating the embodiment shown in Fig. 1 is to so select the magnitude of the auxiliary voltages that the power factor of the motor will be unity at a selected load, for instance at full load, and leave the magnitudes of these introduced voltages constant, allowing the power factor to rise with falling load and to fall when the load exceeds the selected load.

For the purposes of this specification the power factor is considered best or highest when the primary current leads the terminal voltage by 90 degrees; it is considered worst or lowest when the primary current lags 90 degrees behind the terminal voltage.

Throughout this specification the term primary member is applied to that member which carries the windings connected to the supply, which windings carry the line working currents, and whether or not these primary windings produce the revolving flux of the motor which flux always revolves synchronously with respect to the primary member. The other member is referred to as secondary, whether or not it carries a winding or windings which produce all or a part of the revolving flux.

It is immaterial whether it is the secondary or the primary which revolves, the mode of operation remains exactly the same. When the primary revolves it rotates against the direction of rotation of the revolving field or of the basic magnetization of the motor. The commuted winding is then located on the stationary member and the co-operating brushes revolve with the primary. Brush displacements are the same when referred to the revolving flux but opposite when referred to the direction of rotation of the revolving member.

It is well known that any motor can be operated as a generator provided it be driven by a prime mover at a suitable speed, and it is also generally recognized that non-synchronous polyphase motors are no exception to this rule. It is further known that in the case of an asynchronous motor the voltages generated by the primary flux in any winding on the secondary change their direction when the machine passes from sub to super-synchronous speeds. Whenever necessary this condition should naturally be taken into account when operating the motor here disclosed, or any similar motor, as a generator. Thus, when desiring to oppose the formation of any but exciting currents in the exciting winding 3, by injecting auxiliary voltages into said winding, it is necessary to see that said voltages have components which are of proper direction to oppose the voltages concurrently generated in said winding by the primary flux of the machine, whether the machine is used as a motor or operated as a generator. In operating the machine here disclosed as a generator the system of brushes 4, 5, 6, 7 should, therefore, be displaced against the direction of rotation of the revolving field. It is clearly just as desirable to keep the exciting winding 3 free from other than exciting currents when the machine operates as a generator as it is to do so when it is used as a motor. It is, therefore, to be understood that terms used with reference to motor structure and operation are employed descriptively rather than limitatively.

While theories have been advanced in connection with the machines referred to herein, this has been done with a view to facilitating their description and understanding, but it is to be understood that I do not bind myself to these or any other theories.

It is clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

What I claim is—

1. In an asynchronous polyphase motor, a primary, a secondary, a plurality of windings on the primary adapted for connection to the supply, a closed and a commuted winding on the secondary, a polyphase arrangement of brushes cooperating with the commuted winding, means for impressing polyphase voltages of line frequency on the polyphase arrangement of brushes adapted to excite the machine from the secondary and thus control the power factor of the motor, and means for displacing said brushes adapted to cause components of the impressed polyphase voltages to oppose the formation of working currents in the commuted winding.

2. In an asynchronous polyphase motor, a primary, a secondary, a plurality of windings on the primary adapted for connection to the supply, a closed and a commuted winding on the secondary, a polyphase arrangement of brushes cooperating with the commuted winding, a polyphase arrangement of auxiliary windings on the primary of a number of phases equal to that of the polyphase arrangement of brushes, an auxiliary winding being included in each phase of the polyphase arrangement of brushes and located in an axis displaced from the axis of said phase, and means for displacing said brushes adapted to oppose the formation of working currents in the brush circuits.

3. In an asynchronous polyphase motor, a primary, a secondary, a plurality of windings on the primary adapted for connection to the supply, a closed and a commuted winding on the secondary, a polyphase arrangement of brushes cooperating with the commuted winding, means for impressing polyphase voltages of line frequency on the polyphase arrangement of brushes adapted to control the power factor of the motor, and automatic means dependent on the load on the motor for displacing said brushes and adapted to oppose the formation of working currents in the brush circuits.

4. In an asynchronous polyphase motor, a primary, a secondary, a plurality of windings on the primary adapted for connection to the supply, a closed and a commuted winding on the secondary, a polyphase arrangement of brushes cooperating with the commuted winding, means for impressing polyphase voltages of line frequency on the polyphase arrangement of brushes adapted to excite the machine from the secondary and thus control the power factor of the motor, and means for varying the position of the brushes whenever the slip of the motor changes whereby formation of working currents in the brush circuits is opposed.

5. In an asynchronous polyphase motor, a primary, a secondary, a plurality of windings on the primary adapted for connection to the supply, a closed and a commuted winding on the secondary, a polyphase arrangement of brushes cooperating with the commuted winding, means for impressing polyphase voltages of line frequency on the polyphase arrangement of brushes, and means for displacing said brushes in the direction of rotation of the revolving field of the motor as the load on the motor increases to cause components of the impressed polyphase voltages to oppose the formation of working currents in the commuted winding.

6. In an asynchronous polyphase motor, a primary, a secondary, a plurality of windings on the primary adapted for connection to the supply, working and exciting circuits on the secondary in inductive relation to the primary, means including a commutator and brushes for introducing into the exciting circuits on the secondary slip frequency voltages adapted to excite the machine from the secondary and thus control the power factor of the motor, and means for displacing said brushes adapted to cause components of the introduced slip frequency voltages to oppose the formation of working currents in the secondary exciting circuits.

7. In an asynchronous polyphase motor, a primary, a secondary, a plurality of windings on the primary adapted for connection to the supply, working and exciting circuits on the secondary in inductive relation to the primary, means including a commutator and brushes for introducing into the exciting circuits on the secondary slip frequency currents adapted to excite the machine from the secondary and thus control the power factor of the motor, and means dependent on the load on the motor for displacing said brushes adapted to cause components of the introduced slip frequency voltages to oppose the formation of working currents in the secondary exciting circuits.

In testimony whereof I affix my signature this 30th day of July, 1926.

VALÉRE A. FYNN.